United States Patent
Yamasaki et al.

(10) Patent No.: US 8,339,053 B2
(45) Date of Patent: Dec. 25, 2012

(54) LED DIMMING APPARATUS

(75) Inventors: Shigeaki Yamasaki, Osaka (JP);
Hiroyuki Sako, Osaka (JP)

(73) Assignee: Panasonic Corporation, Osaka (JP)

( * ) Notice: Subject to any disclaimer, the term of this patent is extended or adjusted under 35 U.S.C. 154(b) by 236 days.

(21) Appl. No.: 12/738,148

(22) PCT Filed: Oct. 15, 2008

(86) PCT No.: PCT/JP2008/068622
§ 371 (c)(1),
(2), (4) Date: Apr. 15, 2010

(87) PCT Pub. No.: WO2009/054290
PCT Pub. Date: Apr. 30, 2009

(65) Prior Publication Data
US 2010/0219764 A1 Sep. 2, 2010

(30) Foreign Application Priority Data

Oct. 25, 2007 (JP) .................................. 2007-278191
Aug. 19, 2008 (JP) .................................. 2008-211182

(51) Int. Cl.
*H05B 37/02* (2006.01)
(52) U.S. Cl. ........................ 315/209 R; 315/246; 315/308
(58) Field of Classification Search .............. 315/209 R, 315/224, 246, 291, 307, 308
See application file for complete search history.

(56) References Cited

U.S. PATENT DOCUMENTS

| | | | | |
|---|---|---|---|---|
| 7,646,989 B2 * | 1/2010 | Kato | ............................ | 398/197 |
| 8,098,027 B2 * | 1/2012 | Tsai et al. | ........................ | 315/307 |
| 2006/0214603 A1 * | 9/2006 | Oh et al. | ........................ | 315/246 |
| 2008/0074058 A1 * | 3/2008 | Lee et al. | ........................ | 315/291 |
| 2010/0109537 A1 | 5/2010 | Nishino et al. | | |
| 2010/0109571 A1 | 5/2010 | Nishino et al. | | |

FOREIGN PATENT DOCUMENTS

| | | |
|---|---|---|
| CN | 101060752 A | 10/2007 |
| JP | 2002-324685 | 11/2002 |
| JP | 2003-157986 | 5/2003 |
| JP | 2007-189004 | 7/2007 |
| WO | 2005-101916 | 10/2005 |

OTHER PUBLICATIONS

Japan Office Action, dated Jul. 31, 2012, for counterpart Japanese patent application.

* cited by examiner

*Primary Examiner* — Thuy Vinh Tran
(74) *Attorney, Agent, or Firm* — Greenblum & Bernstein, P.L.C.

(57) ABSTRACT

An LED dimming includes: current adjusting means (constant current circuit) for variably controlling a magnitude of a current flowing through an LED load; switching means (transistor) for intermittently controlling the current flowing through the LED load; and dimming controlling means (microcomputer) for controlling the current adjusting means and the switching means upon receiving a dimming signal outputted from a dimmer. In a case where the dimming signal outputted from the dimmer is on a higher brightness side than a predetermined level, the dimming controlling means flows a continuous current though the LED load, and dims the LED load based on a magnitude of the flowing current, and in a case where the dimming signal outputted from the dimmer is on a lower brightness side than the predetermined level, the dimming controlling means flows a pulse current through the LED load, and changes a mean value of waveforms of the pulse current, thereby dims the LED load. In this LED dimming apparatus, noise is less likely to occur even in a case where such an LED current is large, and brightness is less likely to vary even in a case where a dimming degree is increased.

7 Claims, 8 Drawing Sheets

FIG. 2
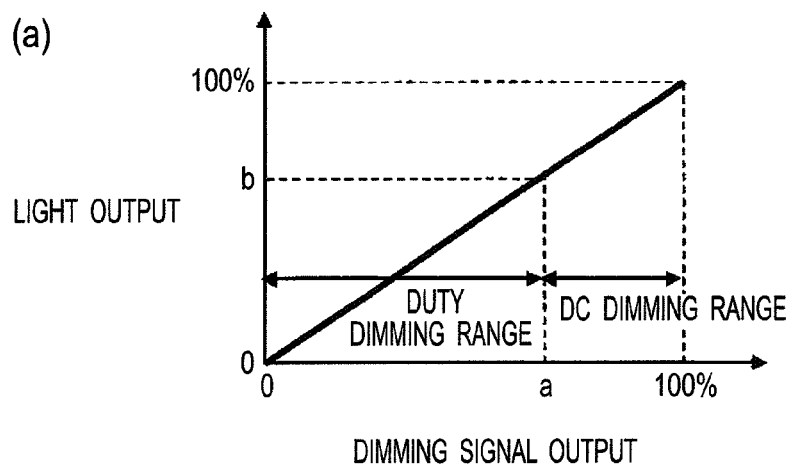
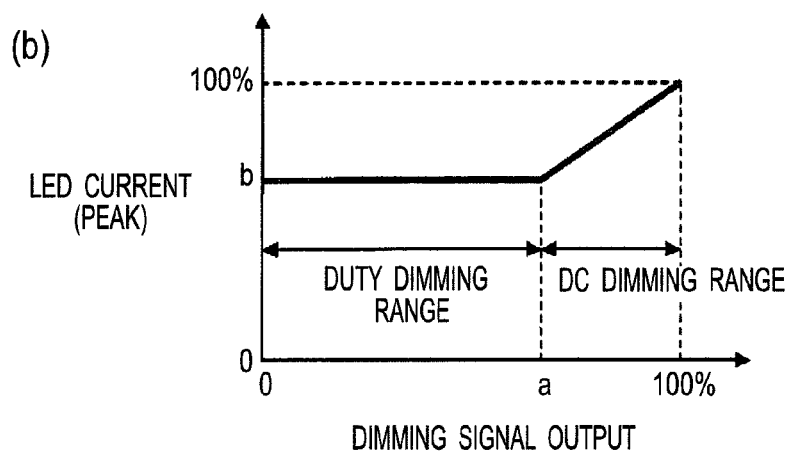
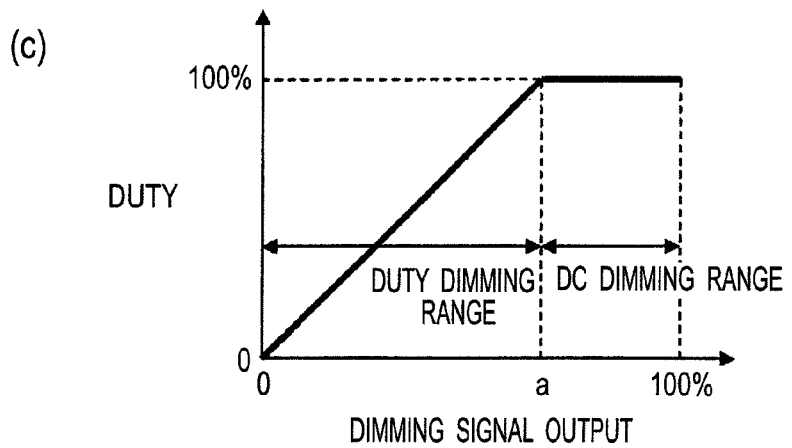

LED DIMMING APPARATUS

TECHNICAL FIELD

The present invention relates to a light emitting diode (hereinafter, referred to as "LED") dimming apparatus that uses an LED as a light source and has a dimming function.

BACKGROUND ART

As a conventional LED dimming apparatus, the one described in Patent Literature 1 (Japanese Patent Laid-Open Publication No. 2003-157986) has been known. This conventional LED dimming apparatus implements control for a voltage applied to an LED and switch dimming of the LED by a switching element that flows and interrupts an LED current in combination with each other. This LED dimming apparatus receives an external dimming signal by a control circuit. When a dimming degree that is based on the dimming signal is low (when emitted light is bright), the LED dimming apparatus constantly maintains the applied voltage to the LED, and dims the light by changing an ON/OFF duty ratio of the switching element. When the dimming degree that is based on the dimming signal is high (when the light is dark), the LED dimming apparatus constantly maintains the ON/OFF duty ratio of the switching element, and dims the light by changing the applied voltage to the LED.

In the case where the applied voltage to the LED is maintained constantly, and the light is dimmed by changing the ON/OFF duty ratio of the switching element, it is necessary to set an ON/OFF frequency of the switching element to be high so that the light from the LED cannot look flickering. Meanwhile, when the dimming degree is high (when the emitted light is dark), an ON-time of the switching element is shortened. In particular, at the time of such light dimming in which the duty ratio is nearly 0%, it is difficult to control the ON-time of the switching element with high accuracy. Therefore, in a low duty-ratio range where the ON-time of the switching element can be controlled with high accuracy, the switch dimming to turn on/off the switching element is performed. At the time of the light dimming when the dimming degree is higher than in the low duty-ratio range where the ON-time of the switching element can be controlled with high accuracy, the ON-time of the switching element is maintained constantly, and the light dimming in which the applied voltage to the LED is changed is performed. In such a way, it becomes possible to perform the light dimming to a higher dimming level in proportion to the dimming signal.

DISCLOSURE OF THE INVENTION

However, the conventional LED dimming apparatus has had a problem that, when an intermittent pulse current is used as a supply current to the LED in the case where the supply current to the LED is large, large noise occurs in the pulse current supplied to the LED. Meanwhile, the conventional LED dimming apparatus has had a problem that, when the current flown to the LED is reduced in the case where a continuous current is used as the current, and the light is dimmed by controlling a magnitude of the current, brightness of the light varies owing to variations among LED devices even if the same current is flown therethrough.

It is an object of the present invention to provide an LED dimming apparatus in which the noise is less likely to occur even in the case where the LED current is large, and the brightness is less likely to vary even in the case where the dimming degree is increased.

In order to solve the above-described problems, in accordance with a first invention, as shown in FIG. 1, an LED dimming apparatus is provided, which includes: current adjusting means (constant current circuit 6) for variably controlling a magnitude of a current flowing through an LED load 4; switching means (transistor Q1) for intermittently controlling the current flowing through the LED load 4; and dimming controlling means (microcomputer 5) for controlling the current adjusting means and the switching means upon receiving a dimming signal outputted from a dimmer 1. In the LED dimming apparatus, in a case where the dimming signal outputted from the dimmer 1 is on a higher brightness side than a predetermined level, the dimming controlling means flows a continuous current though the LED load 4, and dims the LED load 4 based on a magnitude of the flowing current, and in a case where the dimming signal outputted from the dimmer 1 is on a lower brightness side than the predetermined level, the dimming controlling means flows a pulse current through the LED load 4, and changes a mean value of waveforms of the pulse current, thereby dims the LED load 4.

In accordance with a second invention, in the first invention, as shown in FIG. 8, the dimming controlling means includes: constant current controlling means (current feedback control circuit 11) for giving feedback of the current flowing through the LED load 4; and constant voltage controlling means (voltage feedback control circuit 12) for giving feedback of a load voltage applied to the LED load 4, in the case where the dimming signal outputted from the dimmer is on the higher brightness side than the predetermined level, the dimming controlling means flows a direct-current continuous current through the LED load 4 by the constant current controlling means, and performs dimming control for the LED load 4 based on a magnitude of the flowing current, and in the case where the dimming signal outputted from the dimmer is on the lower brightness side than the predetermined level, the dimming controlling means sets the load voltage applied to the LED load 4 by the constant voltage controlling means at a predetermined voltage, and at a same time, flows a pulse current through the LED load 4, and changes a mean value of waveforms of the pulse current, thereby dims the LED load 4.

In accordance with a third invention, in the second invention, as shown in FIG. 12, a range where the constant current controlling means for giving the feedback of the current flowing through the LED load 4 and the voltage controlling means for giving the feedback of the load voltage applied to the LED load 4 are used simultaneously is provided in the predetermined level.

In accordance with a fourth invention, in any of the first to third inventions, as shown in FIG. 3, the predetermined level is set in a range where a ratio of a voltage change with respect to a current change becomes three to five times a case where a rated current is flown through the LED load 4 in V-I characteristics of the LED load 4.

In accordance with a fifth invention, in any of the first to fourth invention, the pulse current has a square waveform, and the dimming controlling means dims the LED load 4 by changing a duty ratio of the square wave.

In accordance with a sixth invention, in any of the first to fifth inventions, as shown in FIG. 4 to FIG. 7, in a case where the dimming signal outputted from the dimmer 1 is on a lower brightness side than a second level placed on the lower brightness side than the predetermined level, the dimming controlling means switches a repetition frequency of the waveform of the pulse current to a lower frequency.

In accordance with a seventh invention, in any of the first to sixth inventions, the repetition frequency of the waveform of the pulse current is within a range of 60 Hz to 100 kHz.

BRIEF DESCRIPTION OF THE DRAWINGS

FIGS. 2(a) to 2(c) are dimming characteristic charts showing operations of the first embodiment of the present invention.

BEST MODE FOR CARRYING OUT THE INVENTION (First Embodiment)

Figure 1:
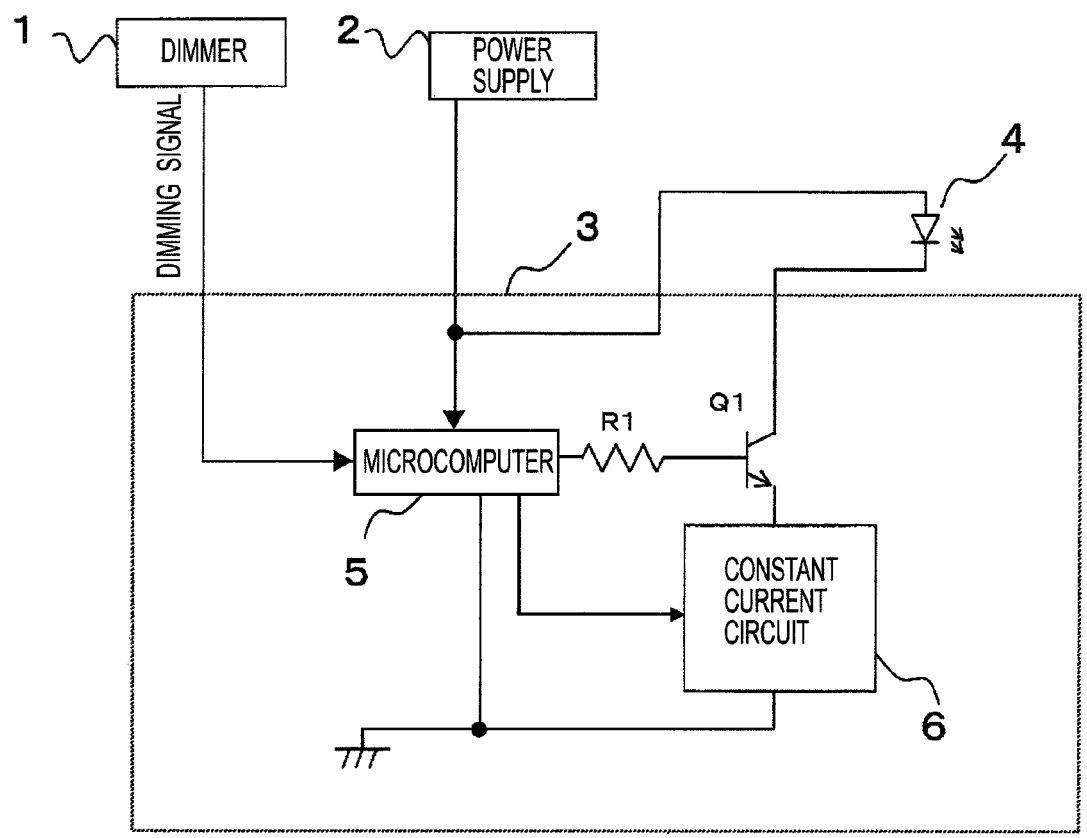
FIG. 1 is a block circuit diagram showing a configuration of a first embodiment of the present invention.

A circuit configuration of a first embodiment of the present invention is shown in FIG. 1. This embodiment is composed of: a dimmer 1, power supply 2; an LED lighting device 3; and an LED load 4. Moreover, the LED lighting device 3 is composed of: a microcomputer 5; a constant current circuit 6; a resistor R1; and a transistor Q1. The constant current circuit 6 is composed so as to flow therefrom a constant current designated by a signal from the microcomputer 5. The microcomputer 5 has functions to read a dimming signal from the dimmer 1, to control ON/OFF of the transistor Q1, and to set a current value of the constant current circuit 6.

A predetermined dimming level (a) is stored in the microcomputer 5. In a range where a dimming degree is lower (where light is brighter), the microcomputer 5 fixes the transistor Q1 to be ON, and dims the light by changing a setting current of the constant current circuit 6. This refers to a DC dimming mode. In a range where the dimming degree is higher (where the light is darker), the microcomputer 5 fixes the setting current of the constant current circuit 6, and dims the light by changing a duty ratio for turning ON/OFF the transistor Q1. This refers to a duty dimming mode.

Operations of the LED lighting device according to this embodiment are shown in FIGS. 2(a) to 2(c). FIG. 2(a) shows a relationship between an output level of the dimming signal and a light output level. FIG. 2(b) shows a relationship between the output level of the dimming signal and an LED current (peak value). FIG. 2(c) shows a relationship between the output level of the dimming signal and a duty ratio of a pulse waveform.

Figure 3:
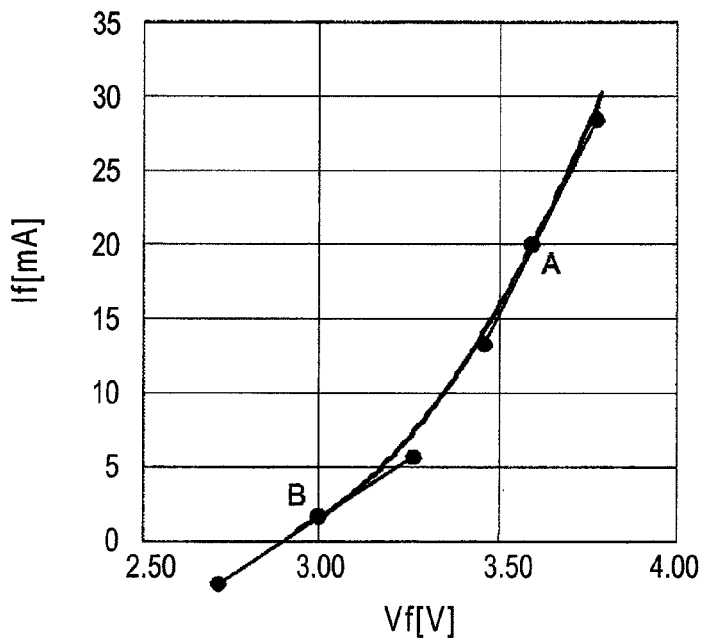
FIG. 3 is a characteristic chart showing load characteristics of the first embodiment of the present invention.

The dimming level (a) is determined by V-I characteristics of an LED device (LED load 4). It is assumed that a certain LED device has V-I characteristics as shown in FIG. 3. In FIG. 3, Vf is a forward voltage, and If is a forward current. $\Delta V/\Delta I$ at the time of a rated current is defined as A. When the current to be flown through the LED device is reduced, $\Delta V/\Delta I$ (defined to be equal to B) is increased. When a value of B becomes three times to five times or more a value of A, the LED device becomes unstable, and variations among such LED devices are also increased. Hence, in a range where the LED device does not become unstable, the dimming level (a) in FIGS. 2(a) to 2(c) is determined so that the light can be dimmed in the DC dimming mode. Moreover, a peak current (LED current) at the time of the duty dimming mode is set at a minimum current at the time of the DC dimming mode as shown in FIG. 2(b). In such a way, the LED current becomes continuous at a portion where the modes are switched, and it becomes possible to dim the light while smoothly switching the modes for a change of the dimming signal.

In accordance with the LED lighting device 3 according to the first embodiment, which is as described above, in the case where the output level of the dimming signal is on such a high brightness side, the light is dimmed in the DC dimming mode. Accordingly, the LED lighting device 3 continuously changes the LED current, supplies the changed LED current to the LED load 4, and lights the LED load 4. Therefore, even if the LED current is increased, noise is less likely to occur in the LED current.

Moreover, in the case where the output level of the dimming signal is on such a low brightness side, the light is dimmed in the duty dimming mode. Accordingly, the LED lighting device 3 intermittently supplies the LED current to the LED load 4 to light the LED load 4. At this time, the LED lighting device 3 controls the peak current (LED current) at a level where variations of the brightness of the LED load 4 (LED device) are not regarded as a problem, and lights the LED load 4. Therefore, it becomes possible to provide the LED lighting device 3 in which the variations in brightness of the LED load 4 are less likely to occur even if the dimming degree is set high (if the light is made dark).

Note that the dimming signal that has the above-described output level and is supplied from the dimmer 1 may be an analog signal (DC 0V to 10V and the like), a duty ratio signal (1 kHz, 10V and the like), or a digital signal (DMX signal and the like). Moreover, the power supply 2 may be an AC power supply or a DC power supply. The LED load 4 may be an LED unit composed of a single device, or an LED unit composed of a plurality of the LED devices.

Moreover, it is possible to substitute the LED load 4 by an arbitrary load that can be lighted by the DC power supply and the pulse power supply, and similar effects can also be obtained in an organic EL and the like.

In the above-described duty dimming mode, the current to be flown through the LED load 4 becomes a square wave, and this square wave has the most effective waveform. Hence, with regard to a form of the current to be supplied to the LED load 4, similar effects to those in the square wave can be obtained if the pulse waveform is other than a flat DC waveform, for example, if the pulse waveform is a sine waveform and a triangular waveform.

(Second Embodiment)

Figure 4:
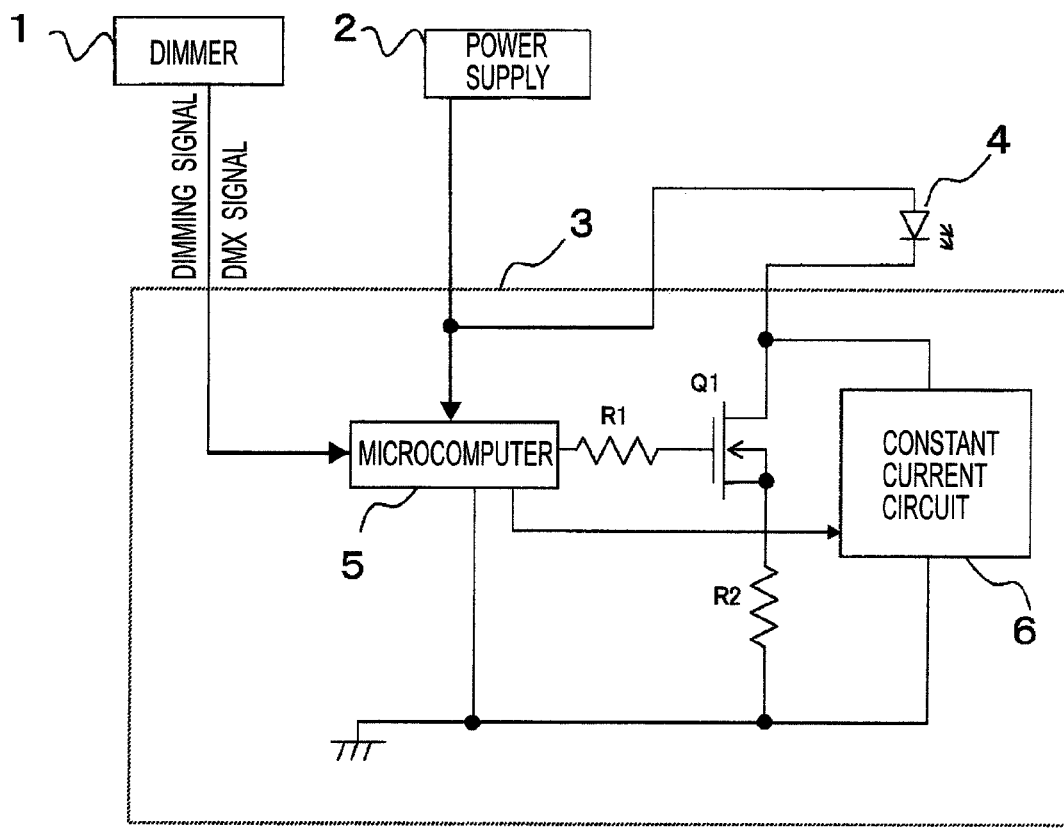
FIG. 4 is a block circuit diagram showing a configuration of a second embodiment of the present invention.

A circuit configuration of a second embodiment of the present invention is shown in FIG. 4. This embodiment is composed of: the dimmer 1; the power supply 2; the LED lighting device 3; and the LED load 4. Moreover, the LED lighting device 3 is composed of: the microcomputer 5; the constant current circuit 6; resistors R1 and R2; and a semiconductor switching element Q1 such as a MOSFET.

The constant current circuit 6 is composed so as to flow therefrom the designated constant current in accordance with a voltage signal from the microcomputer 5. The microcomputer 5 has functions to read the dimming signal from the dimmer 1, to control ON/OFF of the transistor Q1, and to set a current value of the constant current circuit 6. The dimming signal from the dimmer 1 is a DMX signal generally used in lighting. However, the DMX signal only has 256 levels (1 byte), and is insufficient for dimming the LED load 4. Hence, in order to make smooth light dimming in which the brightness of the LED load 4 is switched smoothly, two bytes are used as a data length of the DMX signal, and 0 to 65535 numerical data are used as the dimming signals of the output level. In the case where the numerical data is "0", the LED load 4 is turned out, and in the case where the numerical data is "65535", the LED load 4 is lighted up with light intensity of 100%.

In the case where a value of the dimming signal from the dimmer 1 is 65535 as the maximum value, the microcomputer 5 turns off the switching element Q1, and controls the constant current circuit 6 to flow the maximum current (for example, 1 A) therefrom. Then, a current of 1 A flows through the LED load 4. Next, in the case where the dimming level is reduced to approximately 50%, and 32768 is received as a value of the dimming signal, the microcomputer 5 controls the constant current circuit 6 to flow 500 mA as a half of the maximum current therefrom. Then, the light intensity of the LED load 4 also becomes approximately 50%.

In the case where the dimming level is further reduced a little, and a signal of 32767 is received as the value of the dimming signal, the microcomputer 5 sets the current flowing through the constant current circuit 6 at zero, and turns on the switching element Q1. If the resistor R2 is preset so that a current of approximately 500 mA can flow through the LED load 4 when the switching element Q1 is turned on, then the LED current at this time becomes 500 mA, the light intensity of the LED load 4 is also approximately 50%, and there is hardly a change of the light.

In the case where the dimming level is further reduced to a half of the above, and a signal of 16384 is received as the value of the dimming signal, the microcomputer 5 turns on/off the switching element Q1, and sets the duty ratio thereof at 50%. Then, the light intensity of the LED load 4 becomes approximately 25%.

In the case where the dimming level is further reduced to a half of the above, and a signal of 8192 is received as the value of the dimming signal, the microcomputer 5 turns on/off the switching element Q1, and sets the duty ratio thereof at 25%. Then, the light intensity of the LED load 4 becomes approximately 12.5%.

A low frequency of repeating ON/OFF of the switching element Q1 causes flickering of the LED load 4. Therefore, in general, a repetition frequency of 60 Hz or more is necessary. Moreover, in order to prevent the flickering from appearing in video taking and the like, it is necessary that the LED load 4 be blinked at higher frequency (300 Hz or higher, and the like).

Meanwhile, if there are no limitations on a capability of the microcomputer 5, an upper limit of the repetition frequency is limited by a response speed of the switching element Q1. If there is assumed a case of enabling light dimming of 0.1% under a condition where the response speed of the switching element Q1 is 10 nanoseconds, then 100 kHz (=1/(10 ns×(1/0.1%)) becomes the upper limit of the repetition frequency. However, if the repetition frequency is increased, then a power loss is increased, and the noise becomes prone to occur. Hence, as the repetition frequency, it is recommended to select a frequency in the vicinity of a lower limit thereof. For the sake of simplification, the repetition frequency is defined to be 1000 Hz as the frequency at which the flickering does not occur in the video taking and the like.

Subsequently, if the dimming level is further reduced, and the duty ratio is set at 10% (here, the light intensity of the LED load 4 is 5%), then the LED current has a pulse width of 100 microseconds. If the duty ratio is set at 1% (here, the light intensity of the LED load 4 is 0.5%), then it is necessary that the LED current have a pulse width of 10 microseconds. In the case where the smooth light dimming in which the light intensity of the LED load 4 is changed smoothly is performed, then at least a dimming level to control the duty ratio at approximately 0.1% is necessary. Accordingly, the necessary duty ratio becomes 0.2% (here, the light intensity of the LED load 4 is 0.1%), and the pulse width of the LED current at this time becomes 2 microseconds.

In usual, in the case of realizing the LED current with the above-described short pulse width by the control of the microcomputer 5, a high-performance microcomputer, an external circuit and the like become necessary, and cost is increased. Accordingly, at the point of time when the duty ratio becomes 2% (here, the light intensity of the LED load 4 is 1%), the repetition frequency is reduced by one digit, and is changed to a low frequency as low as 100 Hz. Then, the pulse width of the LED current becomes 200 microseconds, and it becomes possible to dim the light by the LED current with a pulse width of 20 microseconds even if the duty ratio is 0.2%.

Figure 5:
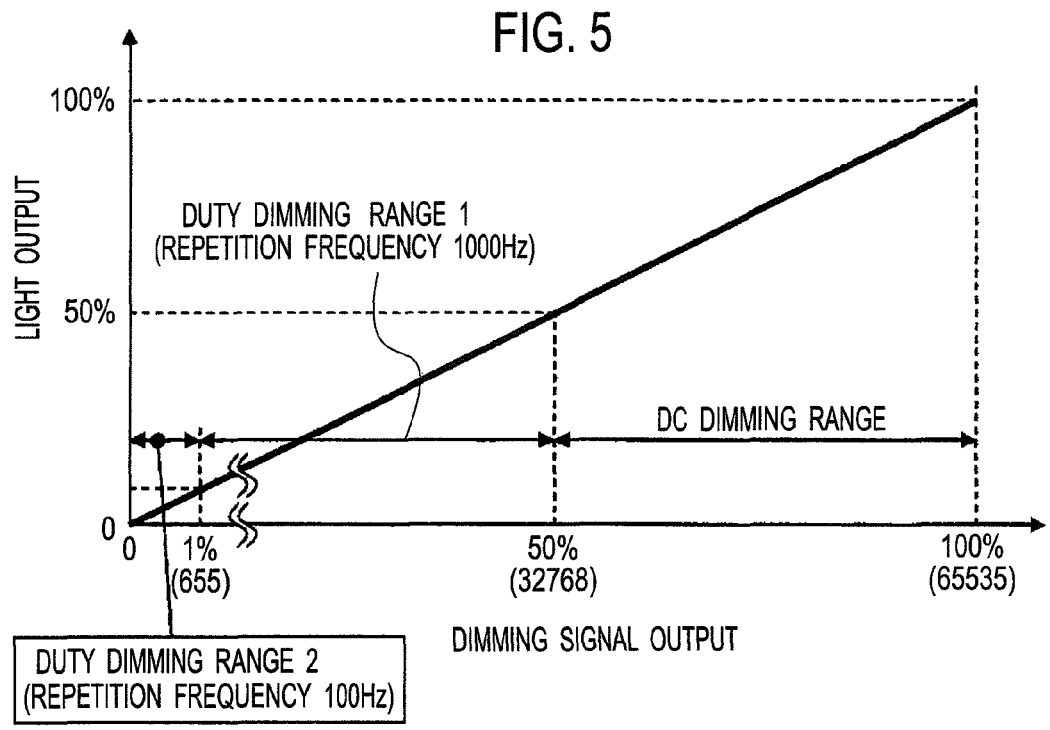
FIG. 5 is a dimming characteristic chart showing operations of the second embodiment of the present invention.
Figure 6:
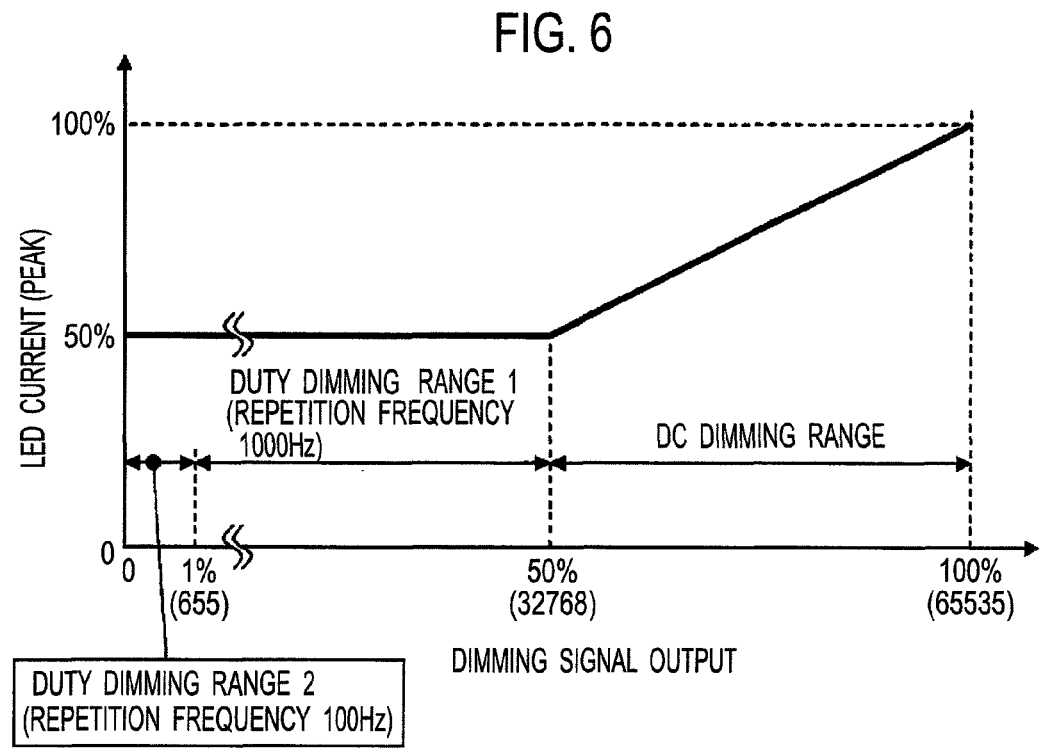
FIG. 6 is a dimming characteristic chart showing the operations of the second embodiment of the present invention.
Figure 7:
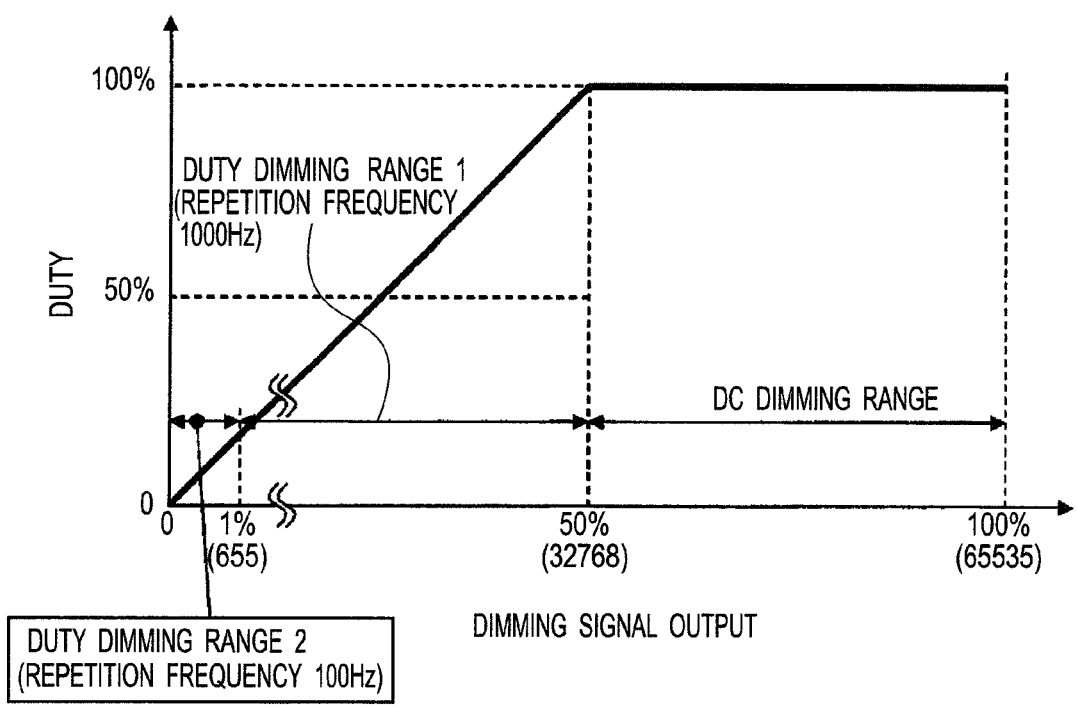
FIG. 7 is a dimming characteristic chart showing the operations of the second embodiment of the present invention.

Operations of this embodiment are shown in FIG. 5 to FIG. 7. FIG. 5 shows a relationship between the output level of the dimming signal and the light output. FIG. 6 shows a relationship between the output level of the dimming signal and the LED current (peak value). FIG. 7 shows a relationship between the output level of the dimming signal and the duty ratio.

Even in this case, if the repetition frequency is set at 60 Hz or higher, then the flickering does not occur visually, and accordingly, no problem occurs. Moreover, at such a blinking frequency as low as 100 Hz, the occurrence of the flickering in the video taking and the like is inevitable; however, in the case where the LED load 4 is used as a light source in the event of the video taking, the occurrence of the flickering does not cause a problem, either since the LED load 4 is considered to be used in a region where the light dimming is low.

With the above-described configuration, the occurrence of the noise is reduced also when the light dimming is performed for the LED load 4 with a large load current, and the variations in light intensity of the LED load 4 when the light dimming is performed to the high dimming degree (to the dark light level) can be reduced. Accordingly, it becomes possible to provide an LED dimming apparatus capable of taking the large dimming ratio and performing the smooth light dimming.

Note that, in the above description, at the time when the output level of the dimming signal is 50%, the mode is switched from the DC dimming mode to the duty ratio dimming mode, and at the time when the output level of the dimming signal is 1%, the repetition frequency in the duty dimming mode is switched from 1000 Hz to 100 Hz. However, the output level of the dimming signal at the time of switching the mode can be changed as appropriate, and also with regard to the change of the repetition frequency, similar effects can be obtained even if the types of the frequencies are further reduced, and control stages of the output level of the dimming signal, at which the frequency is to be switched, are increased. Moreover, dimming means (frequency dimming means) may be used, which is for dimming the light by reducing the repetition frequency while keeping on fixing the ON-pulse width at 1000 Hz without switching the repetition frequency from 1000 Hz to 100 Hz.

(Third Embodiment)

Figure 8:
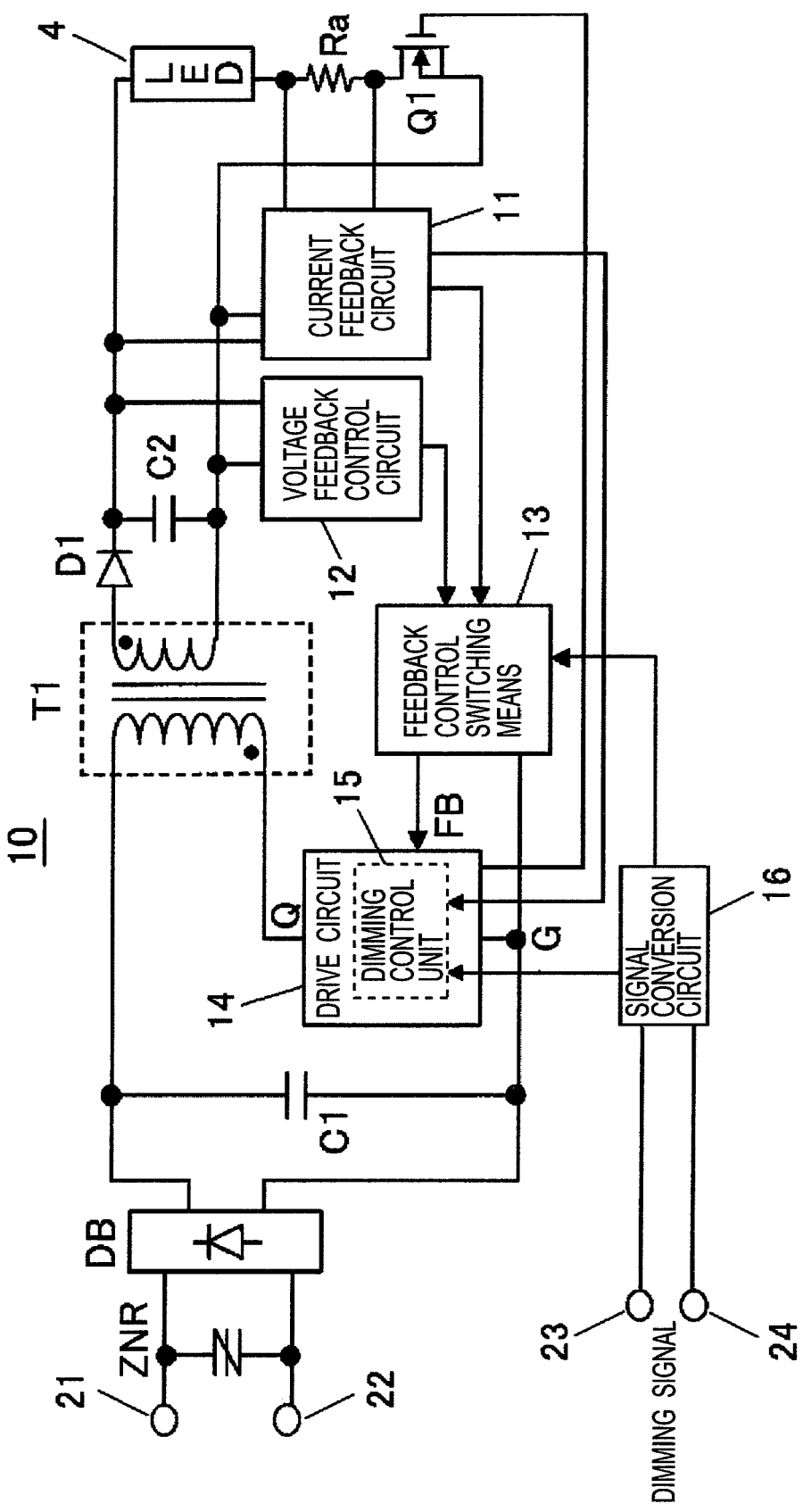
FIG. 8 is a circuit diagram showing an overall configuration of a third embodiment of the present invention.

FIG. 8 is a circuit diagram showing an overall configuration of a third embodiment of the present invention. In this embodiment, a lighting circuit of the LED load 4 is composed of a flyback-type DC-DC converter 10 including two feedback control circuits 11 and 12. A description will be made below of a circuit configuration of the lighting circuit.

To alternating current input terminals 21 and 22 connected to a commercial power supply (AC 100 V, 50/60 Hz), an overvoltage protection element ZNR is connected in parallel, and alternating current input terminals of a diode bridge DB are connected. A smoothing capacitor C1 is connected in parallel to direct current output terminals of the diode bridge DB.

To the smoothing capacitor C1, a primary winding of an insulating transformer T1 is connected through output terminals Q and G of a drive circuit 14. The drive circuit 14 incorporates a power MOSFET (not shown) between the output terminals Q and G thereof. The drive circuit 14 switches a connection between the output terminals Q and G to a short-circuit state (ON state) and an open state (OFF state) at a high frequency, thereby excites the primary winding of the insulating transformer T1 at the high frequency. To a secondary winding of the insulating transformer T1, an output capacitor C2 is connected through a rectifying diode D1. The DC-DC converter 10 is composed of the circuit described above.

To the output capacitor C2, a series circuit of the LED load 4, a current detection resistor Ra and the switching element Q1 is connected in parallel. ON/OFF states of the switching element Q1 are controlled by the drive circuit 14. The switching element Q1 is always in the ON state at the time of high brightness output, and at the time of low brightness output, is driven to turn on/off in a cycle that cannot be sensed by a human eye.

The current feedback control circuit 11 detects a both-terminal voltage of the current detection resistor Ra. The current feedback circuit 11 arithmetically operates a load current based on the detected both-terminal voltage of the current detection resistor Ra, and gives feedback of such a detected value of the load current to the drive circuit 14 through feedback control switching means 13.

The voltage feedback control circuit 12 detects a both-terminal voltage of the output capacitor C2, and gives feedback of such a detected value of a load voltage to the drive circuit 14 through the feedback control switching means 13.

The feedback control switching means 13 receives the respective detected values of the current feedback control circuit 11 and the voltage feedback control circuit 12. The feedback control switching means 13 gives feedback of the detected value of the current feedback control circuit 11 to the drive circuit 14 at the time of the high brightness output, and gives feedback of the detected value of the voltage feedback control circuit 12 to the drive circuit 14 at the time of the low brightness output.

The drive circuit 14 incorporates a dimming control unit 15 therein. The dimming control unit 15 creates control signals for variably controlling a frequency and an ON-time width when the connection between the output terminals Q and G of the drive circuit 14 is driven to turn on/off at such a high frequency, and for driving the switching element Q1 to turn on/off in the cycle that is not sensed by the human eye at the time of the low brightness output.

To dimming signal input terminals 23 and 24, a dimming signal composed of a square wave signal, for example, with a frequency of 1 kHz and a pulse width of DC 10 V is inputted. This dimming signal is converted by a signal conversion circuit 16 into a voltage signal corresponding to the duty ratio of the dimming signal, and is inputted to the dimming control unit 15 and the feedback control switching means 13.

The dimming control unit 15 receives the signal obtained by converting the dimming signal into a DC voltage by the signal conversion circuit 16, and the feedback signals from the feedback control switching means 13. The dimming control unit 15 performs control so that each of the feedback signals can have an appropriate signal level corresponding to the output level of the dimming signal.

Figure 9:
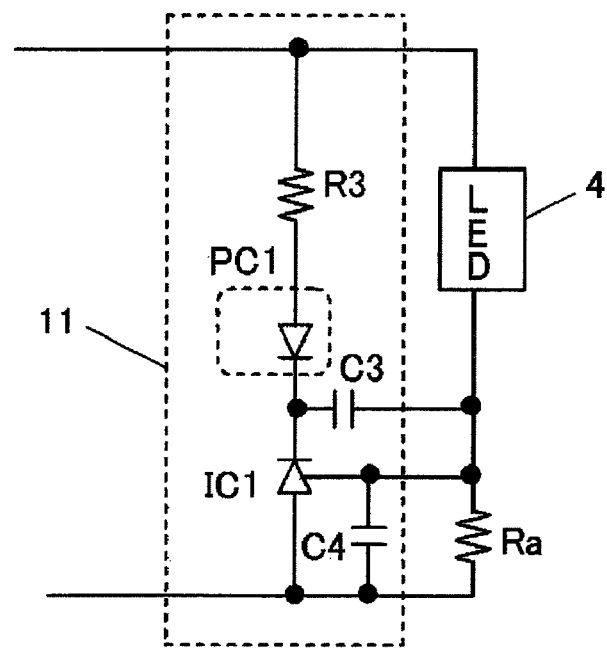
FIG. 9 is a circuit diagram showing a configuration of principal portions of the third embodiment of the present invention.
Figure 10:
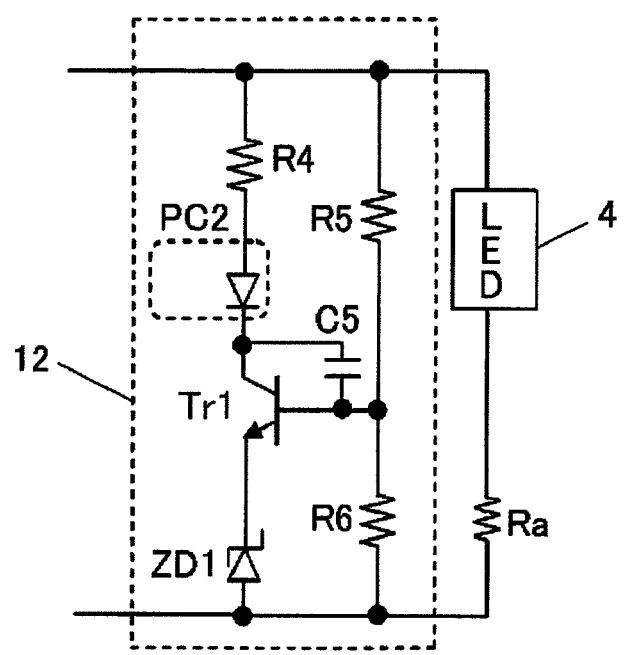
FIG. 10 is a circuit diagram showing the configuration of the principal portions of the third embodiment of the present invention.
Figure 11:
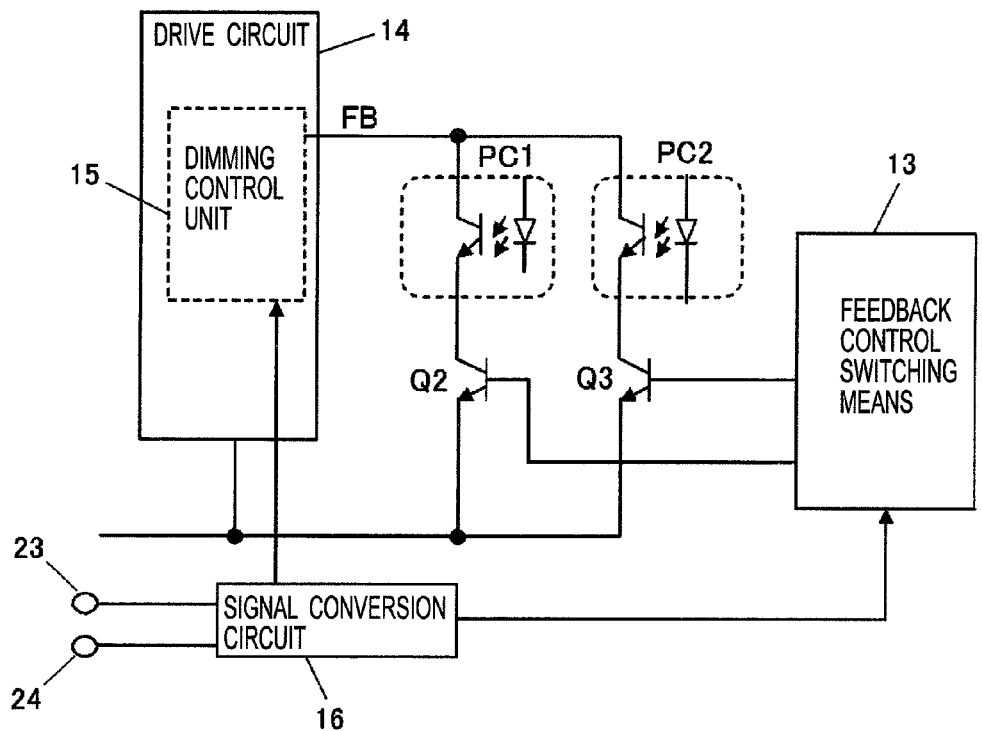
FIG. 11 is a circuit diagram showing the configuration of the principal portions of the third embodiment of the preset invention.

FIG. 9 shows a specific example of the current feedback control circuit 11, FIG. 10 shows a specific example of the voltage feedback control circuit 12, and FIG. 11 shows a specific example of the feedback control switching means 13.

The feedback control circuit 11 of FIG. 9 converts the current flowing through the LED load 4 into a voltage by the resistor Ra, inputs the voltage to an IC 1, and flows a current flowing between a cathode and anode thereof to a light emitting element of a photocoupler PC1, and transmits the current concerned to a light receiving element of the photocoupler PC1, which is shown in FIG. 11. In such a way, the current feedback control circuit 11 performs the feedback control.

The voltage feedback control circuit 12 of FIG. 10 divides the load voltage, which is applied to the LED load 4 and the resistor Ra, by resistors R5 and R6, applies the divided voltage to a base of a transistor Tr1, flows a collector current, which corresponds to a difference thereof from a Zener voltage of a Zener diode ZD1, through a light emitting element of a photocoupler PC2, and transmits the collector current concerned to a light receiving element of the photocoupler PC2, which is shown in FIG. 11. In such a way, the voltage feedback control circuit 12 performs the feedback control.

The feedback control switching means 13 of FIG. 11 receives the feedback signal, which comes from the current feedback control circuit 11 shown in FIG. 9, by the photocoupler PC1, receives the feedback signal, which comes from the voltage feedback control circuit 12 shown in FIG. 10, by the photocoupler PC2, and in response to the dimming level, turns on either one of switching elements Q2 and Q3, and turns off the other. In such a way, the feedback control switching means 13 is configured so that either of the light receiving elements (phototransistors) of the photocouplers PC1 and PC2 can input the feedback signal to a feedback terminal FB of the drive circuit 14.

In the case where the switching element Q2 is turned on, and the switching element Q3 is turned off, constant current feedback control is performed, and the switching element Q1 is maintained in the ON state. On the contrary, in the case where the switching element Q2 is turned off, and the switching element Q3 is turned on, constant voltage feedback control is performed, and under a condition where the output voltage of the capacitor C2 is constant, the dimming control is enabled by duty variable control of the switching element Q1. The switching element Q1 is an ON/OFF switch at the time of performing the duty ratio dimming control.

A description will be made of operations of this embodiment with reference to the dimming curves of FIGS. 2(a) to 2(c). FIG. 2(a) is a graph simulating the change of the light output with respect to the dimming signal output. FIG. 2(a) shows that the light output becomes the maximum in the case where the dimming signal (duty ratio) is 100%, and that the case where the duty ratio is 0% corresponds to a lower limit range of the light dimming. The light output is linearly decreased with respect to the dimming duty ratio (%); however, the light output characteristics are not limited to the linear one, and no particular problem occurs even if the characteristics concerned have some curvedness. Some midpoint (where the dimming signal is a %, and the light output is b) of this dimming curve is defined as a switching point of the control modes. When the output is on a higher brightness side than this point, the switching element Q1 is always in the ON state, and the current feedback control is applied. Meanwhile, when the output is on a lower brightness side than the above-described point, the voltage feedback control is applied, the switching element Q1 is driven to turn on/off in the cycle that is not sensed by the human eye, and the duty ratio variable control is performed in response to the dimming signal.

Similar control can also be applied to the second embodiment (FIG. 5 to FIG. 7). In such a dimming range where the switching element Q1 is subjected to the duty ratio variable control in response to the dimming signal, the voltage feedback control just needs to be selected, and in such a DC dimming range where the light dimming is performed by the current variable control while maintaining the switching element Q1 in the ON state, the current feedback control just needs to be selected.

Figure 12:
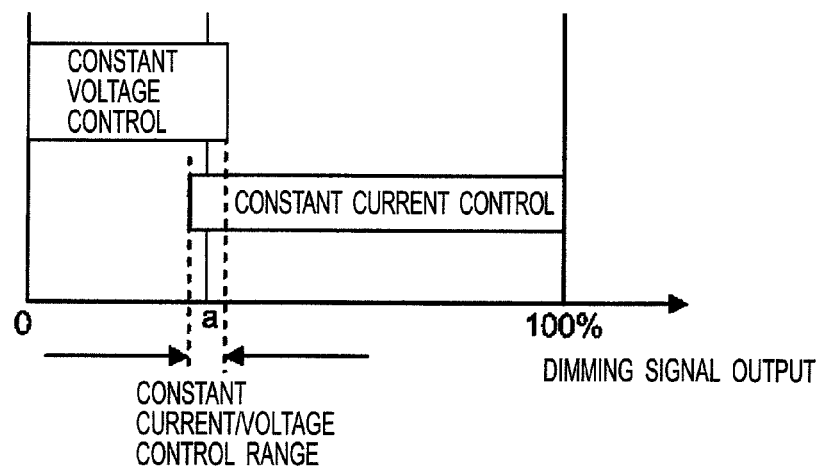
FIG. 12 is an explanatory view showing operations of the third embodiment of the present invention.

Note that, at the point where ON/OFF of the switching elements Q2 and Q3 is switched, it is sometimes possible that the malfunction, the flickering and the like may occur owing to switching timing. Hence, such control to eliminate the malfunction and the flickering can also be performed in such a manner that a range where both of the switching elements Q2 and Q3 are turned on is set, or that, when the feedback control switching means 13 of FIG. 8 selects the detected value of the voltage feedback control circuit 12, the detected value of the current feedback control circuit 11 is simultaneously referred to by the dimming control unit 15. As a conceptual diagram, FIG. 12 shows that a range where the constant current control and the constant voltage control are performed simultaneously may be provided.

In this embodiment, as circuit systems of the current feedback control circuit 11 and the voltage feedback control circuit 12, the configurations of FIG. 9 and FIG. 10 have been illustratively described; however, the circuit systems are not particularly limited as long as the constant current control and the constant voltage control are performed. Moreover, the DC-DC converter 10 is not limited to the one of the flyback type, and may be the one of a forward type.

INDUSTRIAL APPLICABILITY

In accordance with the present invention, the current flowing through the LED load is changed when the light dimming is low and the light is bright, and when the light dimming is high and the light is dark, the current flowing through the LED load is turned to the pulse state, and the light dimming is performed by using the mean value of such pulse waveforms. In such a way, an LED dimming apparatus can be realized, in which the noise is less likely to occur when the light dimming is low, and the variations in brightness are less likely to occur even when the light dimming is made high.

The invention claimed is:
1. An LED dimming apparatus, comprising:
a current adjuster for variably controlling a magnitude of a current flowing through an LED load;
a switch for intermittently controlling the current flowing through the LED load; and
a dimming controller for controlling the current adjuster and the switch upon receiving a dimming signal outputted from a dimmer,
wherein, in a case where the dimming signal outputted from the dimmer is on a higher brightness side than a predetermined level, the dimming controller flows a continuous current though the LED load, and dims the LED load based on a magnitude of the flowing current, and
in a case where the dimming signal outputted from the dimmer is on a lower brightness side than the predetermined level, the dimming controlling means flows a pulse current through the LED load, and changes a mean value of waveforms of the pulse current, thereby dims the LED load.

2. The LED dimming apparatus according to claim 1, wherein the dimming controller includes:
a constant current controller for giving feedback of the current flowing through the LED load; and
a constant voltage controller for giving feedback of a load voltage applied to the LED load,
wherein in the case where the dimming signal outputted from the dimmer is on the higher brightness side than the predetermined level, the dimming controller flows a direct-current continuous current through the LED load by the constant current controller, and performs dimming control for the LED load based on a magnitude of the flowing current, and
in the case where the dimming signal outputted from the dimmer is on the lower brightness side than the predetermined level, the dimming controller sets the load voltage applied to the LED load by the constant voltage controller at a predetermined voltage, and at a same time, flows a pulse current through the LED load, and changes a mean value of waveforms of the pulse current, thereby dims the LED load.

3. The LED dimming apparatus according to claim 2, wherein a range where the constant current controller for giving the feedback of the current flowing through the LED load and the voltage controller for giving the feedback of the load voltage applied to the LED load are used simultaneously is provided in the predetermined level.

4. The LED dimming apparatus according to claim 1, wherein the predetermined level is set in a range where a ratio of a voltage change with respect to a current change becomes three to five times a case where a rated current is flown through the LED load in V-I characteristics of the LED load.

5. The LED dimming apparatus according to claim 1, wherein the pulse current has a square waveform, and the dimming controller dims the LED load by changing a duty ratio of the square wave.

6. The LED dimming apparatus according to claim 1, wherein, in a case where the dimming signal outputted from the dimmer is on a lower brightness side and the dimming signal is less than a second level, the second level being less than the predetermined level, the dimming controller switches a repetition frequency of the waveform of the pulse current to a lower frequency than the repetition frequency when the dimming signal is above the second level.

7. The LED dimming apparatus according to claim 1, wherein the repetition frequency of the waveform of the pulse current is within a range of 60 Hz to 100 kHz.

* * * * *